United States Patent [19]
Bilden et al.

[11] Patent Number: 6,051,535
[45] Date of Patent: Apr. 18, 2000

[54] ASPHALTENE ADSORPTION INHIBITION TREATMENT

[75] Inventors: Dean M. Bilden, The Woodlands; Vicki E. Jones, Tomball, both of Tex.

[73] Assignee: BJ Services Company, Houston, Tex.

[21] Appl. No.: 08/787,124

[22] Filed: Jan. 22, 1997

[51] Int. Cl.$^7$ .............................. C09K 3/00; E21B 37/06
[52] U.S. Cl. ........................... 507/90; 507/200; 507/207; 507/259
[58] Field of Search .................................. 507/200, 207, 507/108, 90, 259; 166/304

[56] References Cited

U.S. PATENT DOCUMENTS

| | | | |
|---|---|---|---|
| 4,236,579 | 12/1980 | Kalfoglou | 166/274 |
| 4,344,487 | 8/1982 | Kalfoglou | 166/274 |
| 4,455,255 | 6/1984 | Stapp | 252/8.55 D |
| 4,465,602 | 8/1984 | McCoy | 252/8.55 D |
| 4,509,597 | 4/1985 | Dardis | 166/274 |
| 4,582,138 | 4/1986 | Balzer | 166/273 |
| 4,609,478 | 9/1986 | Egan | 252/8.55 D |
| 4,610,302 | 9/1986 | Clark | 166/246 |
| 4,627,494 | 12/1986 | Kalfoglou | 166/274 |
| 4,706,749 | 11/1987 | Hayes et al. | 166/267 |
| 4,713,185 | 12/1987 | Howard et al. | 252/8.554 |
| 4,793,419 | 12/1988 | Prukop et al. | 166/270 |
| 4,939,293 | 7/1990 | Stapp | 562/108 |
| 5,068,043 | 11/1991 | Thigpen et al. | 252/855.4 |
| 5,094,296 | 3/1992 | DaGue | 166/275 |
| 5,104,556 | 4/1992 | Al-Yazdi | 166/304 |
| 5,251,698 | 10/1993 | Kalfoglou et al. | 166/274 |
| 5,425,422 | 6/1995 | Jamaluddin et al. | 507/90 |
| 5,494,607 | 2/1996 | Manek et al. | 166/304 |
| 5,504,063 | 4/1996 | Becker et al. | 166/304 |
| 5,690,176 | 11/1997 | Delbianco et al. | 166/304 |

OTHER PUBLICATIONS

Bajsarowicz, "Prudhoe Bay Permeability Damage Study," *Standard Oil Production Company*, 1–107, Dec. 1986.
Buckley, "Asphaltene Precipitation and Crude Oil Wetting," *SPE 26675*, 729–741, 1995.
Clemetz, "Alteration of Rock Properties by Adsorption of Petroleum Heavy Ends: Implications for Enhanced Oil Recovery," *SPE 10683*, 131–134, Apr. 1982.
Collins and Melrose, "Adsorption of Asphaltenes and Water on Reservoir Rock Minerals," *SPE 11800*, 249–254, Jun. 1983.
Crocker and Marchin, "Wettability and Adsorption Characteristics of Crude–Oil Asphaltene and Polar Fractions," *Journal of Petroleum Technology*, 470–474, Apr. 1988.
Cuiec, "Rock/Crude–Oil Interactions and Wettability: An Attempt to Understand Their Interrelation," *SPE 13211*, 1–10, Sep. 1984.
Dubey and Waxman, "Asphaltene Adsorption and Desorption From Mineral Surfaces," *SPE 18462; SPE Reservoir Engineering*, 389–395, Aug. 1991.
Edzwald et al., "Phosphate Adsorption Reactions with Clay Minerals," *Environmental Science & Technology*, 10(5):485–490, May 1976.
Fushimi and Uchimura, "Adsorption Characteristics of Some Clay Minerals and Zeolite," *Memoirs of the School of Science & Engineering*, Waseda Univ. No. 47, 99–110, 1983.
González and Louvisse, "Asphaltenes and its Effect on Oil Production," *SPE 21039*, May 1993.
Gonzalez and Travalloni–Louvisse, "Adsorption of Asphaltenes and its Effect on Oil Production," *SPE 21039; SPE Production & Facilities*, 91–96, May 1993.

(List continued on next page.)

*Primary Examiner*—Philip Tucker
*Attorney, Agent, or Firm*—O'Keefe, Egan & Peterman

[57] ABSTRACT

A subterranean formation is treated to inhibit adsorption of asphaltenes by injecting a treatment fluid containing a sacrificial compound, such as a lignosulfonate. The lignosulfonate may be adsorbed onto formation surfaces in such a way as to act to inhibit the adsorption of asphaltenes. A pretreatment fluid for removing asphaltenes may be injected into the formation before the treatment fluid. The pretreatment fluid may contain an organic solvent, such as terpene.

30 Claims, 2 Drawing Sheets

OTHER PUBLICATIONS

Groffe et al., "Application of Chemicals in Prevention and Treatment of Asphaltene Precipitation in Crude Oils," *SPE 030128*, 499–505, May 1995.

Hong and Bae, "Field Experiment of Lignosulfonate Preflushing for Surfactant Adsorption Reduction," *SPE Reservoir Engineering*, 467–474, Nov. 1990.

Hong et al., "An Evaluation of Lignosulfonate as a Sacrificial Adsorbate in Surfactant Flooding," *SPE 12699*, 273–281, Apr. 1984.

Kim et al., "The Role of Asphaltene in Wettability Reversal," *SPE 20700*, 799–809, Sep. 1990.

Leontaritis, "Asphaltene Deposition: A Comprehensive Description of Problem Manifestations and Modeling Approaches," *SPE 18892*, 599–613, Mar. 1989.

Long and Speight, "Studies in Petroleum Composition: Development of a Compositional "Map" for Various Feedstocks," *Revue De L'Institut Francais Du Petrole*, 44(2):205–217, Mar.–Apr. 1989.

Manrique et al., "The Effect of Crude Oil Composition on Aqueous Phase–Rock Interaction: Implications on Formation Damage in the Enhanced Recovery of Heavy Oil," *SPE 27391*, 473–481, Feb. 1994.

Mansoori, "Modeling and Prevention of Asphaltene and Other Heavy Organic Deposition in Oil Wells," *SPE 27070*, 9–18, Apr. 1994.

McCain, Jr., "Heavy Components Control Reservoir Fluid Behavior," *SPE 28214, JPT*, 746–750, Sep. 1994.

Piro et al., "Evaluation of Asphaltene Removal Chemicals: A New Testing Method," *SPE 27386*, 661–662, Feb. 1994.

Piro et al., "Experimental Study on Asphaltene Adsorption Onto Formation Rock: An Approach to Asphaltene Formation Damage Prevention," *SPE 30109*, 317–327, May 1995.

Sanford and Detroit, "Petrolig Modified Lignosulfonate Applications in Enhanced Oil Recovery," Abstract, American Can Company.

Takhar et al., "Prediction of Asphaltene Deposition During Production–Model Description and Experimental Details," *SPE 30108*, 311–316, May 1995.

Thomas et al., "Controlling Asphaltene Desposition in Oil Wells," *SPE 25483*, 679–686, Mar. 1993.

Viswanathan and Somasundaran, "Abstraction of Sulfonates and Dodecane by Alumina," *SPE 10602*, 101–105, Jan. 1982.

Lignotech USA, Inc. "How Do Our Products Function?", received by Lignotech USA, Inc. on Nov. 29, 1995.

Lignotech USA, Inc. "What Are Our Products Like?", received by Lignotech USA, Inc. on Nov. 29, 1995.

Lignotech USA, Inc. "The Product Range", received by Lignotech USA, Inc. on Nov. 29, 1995.

American Can (which is now owned by Lignotech USA, Inc.) "Product Information", received by Lignotech USA, Inc. on Nov. 29, 1995.

ASPHALTENE ADSORPTION INHIBITION TREATMENT

BACKGROUND OF THE INVENTION

1. Field of the Invention

This invention relates generally to treatment of subterranean formations and, more specifically, to chemical treatment of subterranean hydrocarbon-bearing formations to inhibit the adsorption of asphaltenes onto formation surfaces. In particular, this invention relates to treatment of subterranean hydrocarbon-bearing formations with sacrificial compounds, such as lignosulfonates, to inhibit the adsorption of asphaltenes and similar compounds onto formation surfaces.

2. Description of Related Art

Asphaltene deposition is a common problem in oil production operations. Asphaltenes and related materials may deposit from crude oil in surface production equipment, wellbore tubulars, and/or on subterranean formation surfaces. Besides resulting in production downtime and necessitating potentially expensive remedial and/or stimulation treatments, asphaltene deposition may also result in reservoir wettability changes when deposited in the formation matrix. Reservoir wettability is a significant controlling factor in oil recovery efficiency because of its influence on location, distribution, and flow characteristics of reservoir fluids. Consequently, changes in wettability may impact recovery efficiency by affecting capillary pressure, relative permeability and residual fluid saturations. Deposition of asphaltenes from crude oil is widely believed to alter reservoir wettability toward an oil-wet condition. Because oil recovery efficiency for a given reservoir typically declines as the reservoir becomes more oil-wet in character, deposition of asphaltenes may have an adverse impact on ultimate oil recovery.

Asphaltenes and related compounds are polar components that may be present in crude oil. These polar components may also include maltenes, resins and/or polar aromatic compounds. These compounds are naturally occurring components of crude oil and may exist as a stable colloidal suspension or dispersion in oil. The colloids may be composed of micellar structures consisting of asphaltenes and maltenes. Asphaltenes may include, among other things, aromatic and alkyl groups in combination with heteroatoms, such as nitrogen, sulfur or oxygen. Colloid and micelle destabilization with subsequent aggregation, adsorption, and bulk precipitation of polar crude oil components in a reservoir may be caused by chemical, electrical or physical stimulation. Such stimuli may include exposure to foreign fluids, changes in temperature and pressure, changes in reservoir fluid composition and flow through a permeable reservoir matrix. These stimuli may be introduced to a reservoir during drilling, completion and workover processes, or may occur during production of formation fluids through the matrix to the wellbore.

In the past, asphaltene deposition on formation surfaces has typically been treated with aromatic solvents, such as xylene or toluene. However, these solvent treatments typically only succeed in partial removal of deposited asphaltenes. In addition, these treatments may be expensive due to large volumes required, and typically need to be repeated as asphaltenes are redeposited over time. In addition, asphaltenes solubilized by aromatic solvents may reprecipitate elsewhere in the formation.

Other types of treatments have been directed at preventing asphaltene deposition. These treatments generally focus on stabilizing crude oil chemistry by injecting a "batch" of chemicals into a formation. To prevent or inhibit deposition of asphaltenes, these treatments rely on those chemicals to mix with the crude oil at very low concentrations as the crude oil is being produced. In this way, these treatments attempt to chemically stabilize asphaltene components in the crude oil through mixing with the crude oil as the oil is being produced. The primary failure mechanism for these treatments is that the injected inhibitor chemicals can flow out of the reservoir as easily as the crude oil so the volume of oil treated is very small which results in a very short term inhibition effect. These same chemicals have also been applied by continuous injection down a well annulus or a chemical injection tubing string in a wellbore. The injection string conveys the chemical to the bottom of the well and causes the inhibitor chemicals to mix with the crude oil at that location. Although deposition of asphaltic components in the wellbore may be prevented, this type of treatment does not address the prevention of asphaltene deposition in the reservoir matrix.

SUMMARY OF THE INVENTION

In one respect, this invention is a method of treating a subterranean formation penetrated by a production wellbore to inhibit adsorption of asphaltenes. In this method, a treatment fluid including a sacrificial compound is pumped through the production wellbore and contacted with the subterranean formation.

In another respect, this invention is a method of treating a subterranean formation penetrated by a production wellbore to inhibit adsorption of asphaltenes. In this method a treatment fluid including an aqueous solution having between about 0.1% and about 50% by weight of at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof is pumped through the production wellbore and injected into the subterranean formation.

In yet another respect, this invention is a method of removing and inhibiting adsorption of asphaltenes in a subterranean formation penetrated by a production wellbore. In this method a pretreatment fluid that is effective in removing asphaltic components present on surfaces of the subterranean formation is first pumped through the production wellbore and injected into the subterranean formation. A treatment fluid including a lignosulfonate is then pumped through the production wellbore and injected into the subterranean formation.

DESCRIPTION OF SPECIFIC EMBODIMENTS

Figure 1:
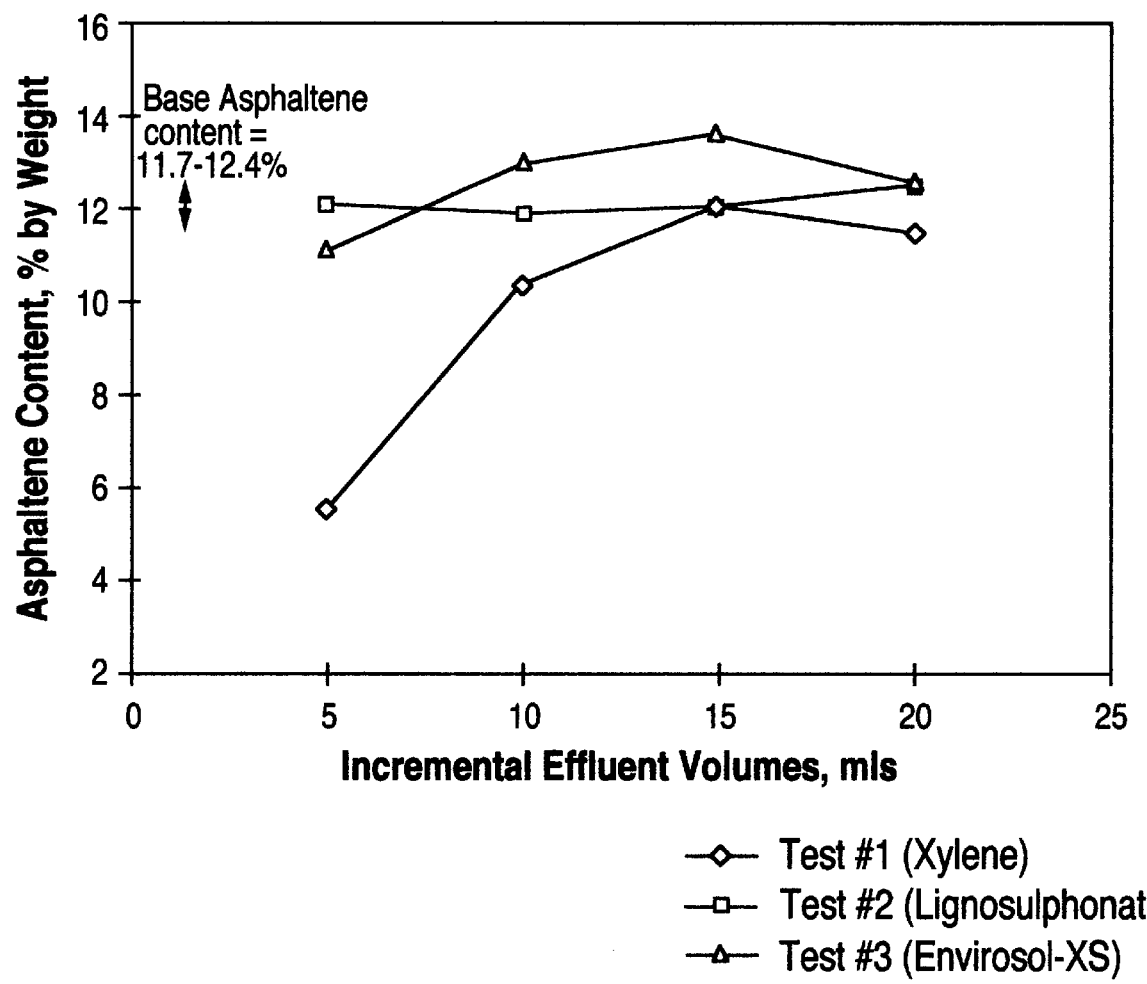
FIG. 1 shows asphaltene content in crude oil after exposure to silica-gel/alumina packed chromatographic columns.

In embodiments of the disclosed method, asphaltenes and other polar compounds found in crude oil are prevented from physically adsorbing onto formation minerals. In the disclosed method, asphaltene inhibitor treatment fluids containing "sacrificial compounds," such as lignosulfonate based compounds may be employed to prevent adsorption of asphaltenes, that may plug formation pores, by attaching onto mineral surfaces. As used herein, "sacrificial compounds" includes compounds which adsorb onto formation surfaces, act as surfactants, or act otherwise in a manner that prevents or reduces the adsorption of asphaltenes.

In some embodiments of the disclosed method, treatment with a sacrificial compound solution is designed to replace adsorption points on formation grain surfaces, preventing deposition of asphaltenes and related materials during oil production. In some embodiments, the disclosed method may take advantage of the electrochemical action of sacrificial compounds such as lignosulfonates. For example, lignosulfonate ions may be adsorbed onto the surfaces of formation particles or mineral grains, resulting in electrostatic repulsive forces that keep the particles or mineral grains from adsorbing polar materials from crude oil.

In the practice of the disclosed method, a sacrificial compound may be used to treat a subterranean formation penetrated by a production wellbore in a number of ways, including before or after other formation treatment fluids, or in a mixture with other materials. This includes being mixed with or used in combination with any other type of stimulation treatment performed on a new or existing production well. For example, a lignosulfonate treatment fluid may be preceded by a pretreatment fluid comprising any water, brine, or hydrocarbon based solvent, mutual solvent, organic solvent, gas or other fluid suitable for cleaning and/or altering wettability of a formation surface, including, but not limited to, aromatics such as xylene or toluene (and forms thereof), acids such as HCl or HF, and mixtures thereof. Alternatively, a lignosulfonate treatment fluid may be used alone without a pretreatment fluid, and/or may be injected into a formation preceding or following other formation treatments, such as hydraulic fracturing treatments used for the purpose of stimulating hydrocarbon production. In addition, an inhibitor treatment fluid may comprise a sacrificial compound, such as a lignosulfonate, mixed with other materials, including, but not limited to at least one of water, a surfactant, an acid, a hydrocarbon, an organic solvent, a natural solvent, a gas, a brine, or a mixture thereof. One typical example is a lignosulfonate compound mixed with an organic solvent, water, salt and surfactants.

In the practice of one embodiment of the disclosed method, any concentration and type of sacrificial compound which has the capacity to adsorb onto subterranean reservoir matrix surfaces may be employed. Suitable compounds include, but are not limited to, alkaline inorganic salts, such as sodium phosphates and sodium silicates, as well as organic lignosulfonates and modified lignosulfonates. Other suitable compounds include pulp bleach plant effluents, and E-stage bleach plant effluents. Suitable lignosulfonate based compounds include, but are not limited to lignosulfonates, oxylignins and kraft lignins or mixtures thereof. These compounds are typically produced from the chemical pulping of hard and softwoods. Kraft lignins (such as "INDULIN" kraft black liquor) are generated from a sulfate process while lignosulfonates are produced from a sulfite process. Oxidized lignins are produced through the extraction of vanillin from the sulfite process liquor which are then processed into oxylignins. Other sources of suitable sacrificial compounds include oxidized and/or chlorinated kraft black liquor, chlorinated spent sulfite liquor, chlorinated sulfited hemlock tree bark, oxidized lignin isolated from steam exploded poplar wood (using caustic soda), and vanillin black liquor. Other suitable sacrificial compounds include oxidized and/or chlorinated lignins, lignin-like polyphenolic derivatives, lignosulfonate salts modified by alkoxylation, sulfonated alkali lignins (such as "REAX" available from West Virginia Pulp and Paper Company), unsulfonated alkali lignins, sulfite lignins, etc.

Specific types of suitable lignosulfonate compounds include, but are not limited to, oxidized lignosulfonates, alkoxylated lignosulfonates (such as alkoxylated lignosulfonates formed by reacting modified or unmodified lignosulfonates with epoxides like ethylene oxide, propylene oxide, butylene oxide, etc.), chrome lignosulfonates, lignosulfonates carboxylated with chloracetic acid, sulfomethylated lignosulfonates, lignosulfonates carboxylated with carbon dioxide and halocarboxylic acid, lignosulfonate salts (such as sodium, calcium, magnesium, and ammonium salts of lignosulfonate), lignosulfonic acids, and mixtures thereof (the acids and salts being available under various trade names, including "MARASPERSE," "LIGNOSITE," "ORZAN," "TORANIL," and "RAYFLO"). Alkoxylated lignosulfonates include those that are unmodified before alkoxylation or which are modified by oxidation, sulfomethlyation, carboxylation with chloracetic acid and/or carboxylation with carbon dioxide before or after alkoxylation. Mixtures of various sacrificial compounds (and mixtures of and with lignosulfonates in particular) may also be employed.

In addition to those compounds described above, suitable sacrificial compounds that may be used in the disclosed method also include, but are not limited to, "sacrificial agents" which are known to those of skill in the art. Examples of such sacrificial agents include, but are not limited to, those sacrificial agents described in U.S. Pat. No. 4,236,579 to Kalfoglou, U.S. Pat. No. 4,344,487 to Kalfoglou, U.S. Pat. No. 4,713,185 to Howard et al., U.S. Pat. No. 4,509,597 to Dardis, U.S. Pat. No. 4,610,302 to Clark, U.S. Pat. No. 4,627,494 to Kalfoglou, U.S. Pat. No. 5,068,043 to Thigpen et al., U.S. Pat. No. 5,094,296 to DaGue, U.S. Pat. No. 5,251,698, to Kalfoglou et al, which are incorporated herein by reference to the extent that these references disclose or describe types of sacrificial agents.

In the practice of the disclosed method, a treatment fluid including any concentration of sacrificial compounds capable of inhibiting the adsorption of asphaltenes may be employed. Typically, a treatment fluid comprising between about 0.1% to about 50% of sacrificial compound, most typically between about 1% and about 5% sacrificial compound, is employed. More typically, a lignosulfonate based compound is employed as a sacrificial compound in these concentrations. However, it will be understood with benefit of the present disclosure that concentrations (as well as types) of sacrificial compounds may be selected based on the nature of the asphaltene problem being treated, and that concentrations of sacrificial compounds in a treatment fluid may also be varied based on particular sacrificial compounds selected. In one embodiment, a treatment fluid may comprise an aqueous solution comprising one or more sacrificial compounds, one or more surfactants, one or more organic solvents, and one or more salts. The same types of suitable surfactants, solvents, and salts described elsewhere in this disclosure for use in a pretreatment fluid may be employed in this embodiment. In this embodiment, the treatment fluid may comprise any suitable concentrations of these components, but typically includes lignosulfonate in the sacrificial compound concentrations given above. The treatment fluid also typically includes from about 0.1% to about 10% by volume of surfactant (most typically from about 0.1% to about 1% by volume surfactant), from about 1% to about 50% by volume of organic solvent, and from about 0.5% to about 10% by weight of one or more salts.

In many cases, when a lignosulfonate is employed, the most desirable lignosulfonate compound may depend on characteristics of a particular crude oil and formation sensitivity. For example, some formations may be sensitive to fluid pH values greater than about 10. Therefore, the concentration and type of lignosulfonate material used to treat a well completed in such a formation is typically selected to result in a solution having a pH of below about 10. Because lignosulfonate tends to raise pH, formation sensitivity will affect permissible concentrations of lignosulfonate inhibitor. Selection of a particular lignosulfonate may also be crude dependent.

As shown in Examples 5–7, a straight chain sodium lignosulfonate compound (known as "R-1", or alternatively as "VANISPERSE CB", and available from "LIGNOTECH, U.S.A.") has proven suitable for treatment of certain formations and crude oils. In these examples, a typical treatment included a 3% sodium lignosulfonate solution in brine. Other lignosulfonates used in Examples 3 and 4 are suitable for use in the disclosed method and include a modified calcium lignosulfonate (known as "R-3", or alternatively as "MARABOND 21" and available from "LIGNOTECH, U.S.A."), a modified sodium lignosulfonate (known as "R-8", or alternatively as "KELIG 32", and available from "LIGNOTECH, U.S.A."), and a modified calcium lignosulfonate (known as "R-21L", or alternatively as "MARABOND 121" and available from "LIGNOTECH, U.S.A."). Although particular embodiments of lignosulfonate inhibitor fluid were employed on sandstone cores in the accompanying examples, embodiments of lignosulfonate inhibitor fluid may also be used successfully on other types of geologic formations including limestone, dolomite, shale, siltstone, diatomite, etc.

In the practice of the disclosed method, a subterranean formation may be treated with lignosulfonate inhibitor material at matrix or fracturing treatment rates. However, typically a non-fractured formation is treated at a matrix rate in an attempt to achieve near-radial flow in which lignosulfonate inhibitor treatment fluid may contact a maximum amount of reservoir matrix material immediately surrounding the wellbore. In embodiments of the disclosed method, substantially any volume of lignosulfonate inhibitor treatment fluid may be used. In some cases, a treatment volume may be designed to be greater than or equal to the volume required to treat a subterranean formation out to a radius where asphaltene precipitation has and/or is expected to occur. Since asphaltene precipitation may be a pressure dominated phenomenon, a treatment is typically designed to contact and affect a formation matrix existing in a radius anywhere from a few inches to several tens of feet from a wellbore penetrating the subterranean formation. Most typically, a treatment volume will be sufficient to contact a formation matrix existing in a radius of at least about three feet from a wellbore when the treatment is pumped at a matrix treating rate and radial flow achieved.

Although not necessary to the practice of the disclosed method, in one embodiment a two-stage water-based treatment is employed to clean and protect mineral surfaces from asphaltene adsorption. In this embodiment, the first stage is designed to remove damage caused by organic deposition, and the second stage to help prevent future damage by inhibiting polar compounds in crude oil from adsorbing onto formation minerals and/or causing the formation to become oil-wet. In this embodiment, the first stage of the treatment may be a pre-flush or pretreatment fluid consisting of an emulsified fluid or dispersion that includes organic solvent in brine. The second stage of the treatment may consist of a water-based lignosulfonate treatment fluid solution. In this embodiment, the pretreatment fluid may be applied as a pre-flush to clean and condition formation mineral surfaces to receive the second stage inhibition treatment. The pretreatment fluid is designed to lower viscosity of any oil that may be trapped in the formation, and to simultaneously clean the formation by removing polar compounds (such as, for example, maltenes, asphaltenes, resins, etc.) that may be adsorbed onto mineral surfaces. In this capacity, the pretreatment fluid of this embodiment is designed to leave a formation surface water-wet in order to enhance ability of the asphaltene inhibitor of the treatment fluid to strongly and thoroughly adsorb onto mineral surfaces. The lignosulfonate of the second stage treatment fluid is designed to inhibit or prevent naturally occurring surfactants that are found in crude oils from adhering to the ionic surfaces of formation minerals. In this way, polar compounds from crude oil are prevented from attaching to mineral grains and forming organic deposits.

In the past, aromatic based solvent treatments have been typically used to remove organic formation damage from reservoir matrices. Xylene (a mixture of Ortho-, Meta- and Para-Xylene) is a commonly used aromatic. More fully refined, specific types of xylene, have also been used but on a limited basis due to economics. Toluene has also been commonly used to remove organic formation damage, but its use has also been limited by economics.

It is believed that if asphalt deposition has occurred in a matrix, then the formation rock is likely to be oil-wet. Aromatics such as xylene may have the capability of removing organic formation damage. However, aromatics alone do not have the ability to change the wettability of a sandstone because they are not polar and do not have a micellar structure. Therefore, surfactants have been used with aromatic treatments in an attempt to reverse the oil wetting condition. An oil soluble or dispersible surfactant(s) is typically added to xylene to create a water-wet surface after it has removed an organic deposit. These surfactants have micellar structures with one end containing a positive, negative or neutral charge. These are referred to as cationic, anionic and nonionic respectively. It is believed that the anionics will generally water-wet sandstone, while cationics will generally water-wet carbonate formations. Nonionics will water-wet both.

It is believed that the ability for crude oil polar components to adsorb onto sandstone increases when water saturation is replaced with xylene. There are two possible explanations for this. First, water saturation in a water-wet sandstone may be a physical barrier to adsorption of polar components. Secondly, dilution of crude oil with a refined, non-polar solvent reduces the stability of the colloidal asphaltic components. This dilution effect creates a more highly polar crude oil, translating into a higher adsorption capacity between a rock surface and asphaltic components. Therefore, when crude oil flows to the wellbore, through a xylene saturated matrix, adsorption readily occurs and causes an oil-wet condition.

Xylene and other similar aromatic solvents may be used in the practice of the disclosed method, and one embodiment of the disclosed method addresses the above problems by providing a water-based solvent pretreatment system to remove organic deposition in the sandstone matrix before addition of asphaltene inhibitor. A treatment fluid including a lignosulfonate is then pumped through the production wellbore and injected into the subterranean formation. In these embodiments, a first stage pretreatment fluid is typically a terpene-based water/organic solvent emulsion that is capable of cleaning mineral grain surfaces. Types of terpenes that may be employed include, but are not limited to, citrus and pine terpenes. Typically a citrus terpene is employed. Most typically the terpene employed is d-limonene ($C_{10}H_{16}$). A second stage treatment fluid is typically a water based lignosulfonate fluid that is capable of adsorbing onto grain surfaces.

In the practice of the disclosed method, a pretreatment fluid is typically a water-based fluid comprised of a salt solution and one or more surfactants with an organic solvent phase dispersed or emulsified into the solution. The organic solvent phase may be used in any suitable concentration, but typically ranges in concentration from about 1% to about 50% by volume of the total volume. Salt content may also be of any suitable concentration, but typically ranges from about 0.5% to about 10% by weight. The pretreatment fluid also typically includes any suitable concentration of surfactant, typically from about 0.1% to about 10% by volume of surfactant, most typically from about 0.1% to about 1% by volume surfactant. Any suitable salt may be employed, including any salt or combination of salts found in oil field fluids, or which are suitable for adding to oil field fluids (such as for fluid weighting purposes or to provide fluid compatibility with formation minerals). Typically a salt solution includes naturally occurring salts (such as those found in formation brines), and/or potassium chloride (KCl). Some examples of naturally occurring salts include, but are not limited to, sodium chloride, calcium chloride, and magnesium chloride. Surfactants may include those anionic, cationic, and nonionic surfactants previously described.

A terpene pretreatment fluid may contain anywhere from a very small amount of terpene to 100% terpene, typically from about 0.1% to about 50% by volume terpene, more typically from about 1% to about 50% by volume terpene, and most typically from about 5% to about 20% by volume terpene. For example, one suitable commercially available pretreatment fluid is known as "BIOACT AE-O" and is available from "PETROFERM, INC." "BIOACT AE-O" is a blend of hydrocarbon solvent (d-limonene terpene) and nonionic surfactants that disperse readily in water, allowing treatment for removal of paraffin and asphaltene accumulations in a water-based treatment fluid. The surfactants in "BIOACT AE-O" enable the solvent to be mixed with water. Although undiluted BIOACT AE-O may be used as a pretreatment fluid, BIOACT AE-O may also be mixed with brine to form a pretreatment fluid having from about 1% to about 50% by volume of "BIOACT AE-O", which is known as "ENVIROSOL-XS" (available from "BJ SERVICES"). Other terpene-based solvents may be mixed in a similar manner with brine as a pretreatment fluid. When used, "ENVIROSOL-XS" is effective in removing heavy oil trapped in the pores of the formation and cleaning the surface of the mineral grains so the asphaltene inhibitor treatment fluid may be adsorbed by mineral surfaces. Advantageously, "BIOACT AE-O" is substantially biodegradable, essentially non-toxic, and contains substantially no chlorine or heavy metals.

Although typical terpene concentrations in aqueous solution compositions have been described above, it will be understood with benefit of the present disclosure that any concentration of terpenes, surfactants and/or aqueous solution compositions suitable for removing organic deposition and/or water wetting a formation may be employed. Suitable pretreatment fluids are believed to substantially remove oil from formation surfaces and leave a clean surface for the lignosulfonate inhibitor to adsorb onto. After formation surfaces are exposed to the pretreatment fluid, the matrix may remain predominantly water saturated. Then it is believed that as crude oil flows to a wellbore it will reduce water saturation to an irreducible level, maximizing relative permeability to oil while the lignosulfonate compound will protect formation surfaces from polar component adsorption and wetting alteration.

In a typical two stage treatment embodiment of the disclosed method, the volume of pretreatment fluid is about the same as the volume of lignosulfonate inhibitor treatment fluid injected, but may be more or less depending on the severity of previously adsorbed asphaltenes. In a manner similar to a lignosulfonate treatment fluid, a pretreatment fluid may be injected above or below a formation fracturing pressure, typically below fracturing pressure for non-fractured formations.

EXAMPLES

The following examples are illustrative and should not be construed as limiting the scope of the invention or claims thereof.

All asphaltene measurements were performed by using the following procedure. Approximately 1 gram of crude oil was weighed into a pre-weighed centrifuge tube. Hexane, at a ratio of 40 to 1, was added to precipitate the asphaltenes. The sample was centrifuged and the hexane slowly decanted. The steps of adding hexane and centrifuging were repeated until the hexane became clear, an indication the hexane solubles had been removed, leaving asphaltenes in the bottom of the centrifuge tube. The centrifuge tube was dried, cooled, re-weighed, and the asphaltene content calculated as percent by weight.

Example 1

The effectiveness of sacrificial compounds as treatment fluids was measured relative to the ability of each fluid to prevent adsorption of asphaltenes onto a polar material.

For testing, a 50 mL syringe was packed with silica-gel and alumina. Each selected sacrificial compound listed in Table 1 was added to the syringe and allowed to contact the silica gel/alumina mixture for thirty minutes. Crude oil was added next. After the crude oil was added, the syringe was placed in a 50° C. oven for two hours to allow asphaltene adsorption to occur. The oil was then pushed through the syringe, collected, and the crude oil was analyzed for asphaltene content. Results are shown in Table 1. The average asphaltene content of the crude oil ranged from 11.7% to 12.4%, by weight. As shown in Table 1, the listed sacrificial compounds demonstrated the ability to inhibit precipitation of asphaltenes on the column. This is evidenced by asphaltene values greater than or equal to the asphaltene content of the crude oil. In particular, this example shows the ability of sodium lignosulfonate and other sacrificial compounds to inhibit precipitation of asphaltenes.

TABLE 1

Results of Adsorption Inhibition Testing

| Chemical | % Asphaltene, by weight |
|---|---|
| Na naphthalenesulfonate-formaldehyde | 12.8 |
| Na Lignosulfonate | 13.6 |
| Alkylated naphthalene sulfonic acid in aromatic solvent | 14.6 |
| Isopropylamine dodecylbenzene sulfonate | 12.5 |

TABLE 1-continued

Results of Adsorption Inhibition Testing

| Chemical | % Asphaltene, by weight |
| --- | --- |
| Ammonium salt of PNS | 13.3 |
| Lignosulfonate (high temp) | 12.8 |
| Calcium salt of PNS | 13.2 |
| Potassium salt of PNS | 13.1 |
| Alkylamine alkylaryl sulfonate | 12.2 |
| Na alkylnaphthalene sulfonate | 12.4 |

Example 2

Adsorption Inhibition Analysis

A silica-gel/alumina mixture was used in tests to measure adsorption tendencies of asphaltenes from crude oil. Although a mixture of silica-gel and alumina is not a formation mineral, as far as adsorption tendencies of polar materials are concerned, it represents the worst case scenario due to its high ionic surface energy. As crude oil flows through a silica-gel/alumina mixture, asphaltenes adsorb onto the exposed surfaces of the silica-gel and alumina particles. Glass columns were packed with the silica-gel/alumina mixture to facilitate flowing not only crude oil but also various test chemicals both before and after flowing crude oil through the packed columns. A reduction of asphaltene content in the crude oil effluent samples is evidence of adsorption of the asphaltene fraction onto the surface of the silica-gel and alumina particle surfaces.

In each test, a glass chromatography column was packed with a known mixture of silica-gel and alumina, and the column was wrapped and heated with heat tape. The column was heated to approximately 50° C. before oil or treatment fluid was added to the column to prevent the precipitation of paraffin.

In some tests, crude oil was added to dry silica-gel/alumina column before saturation with water to simulate an oil-wet environment. In these tests, the addition of oil to a dry column resulted in asphaltene adsorption on the packing material. In each of these tests, the treatment fluid was then added to the column to see how well it coated the grains and reversed the wettability of the silica-gel/alumina mixture to a water-wet environment so as to prevent further adsorption of asphaltenes. This testing method was also used to determine effectiveness of each pretreatment fluid in removing damage caused by asphaltene adsorption.

Finally, another type of adsorption test was conducted by first adding treatment fluid to the silica-gel/alumina mixture to determine if the fluid prevented asphaltenes from adsorbing onto column grains after the crude oil was added later to the column.

FIG. 1 contains the results of testing which demonstrates the ability for Sodium Lignosulfonate to prevent the adsorption of asphaltenes. Three separate chromatographic columns were used for tests #1, #2, and #3. The base or original asphaltene content of the crude oil used in these tests ranged from 11.7 to 12.4% by weight. In these tests, the silica-gel/alumina column was saturated with three different solutions prior to flowing crude oil through them. Tests #1, #2 and #3 were saturated, respectively, with xylene, sodium lignosulfonate and "ENVIROSOL-XS".

After the columns were fully saturated with the respective solutions, crude oil was flowed through them and collected in 5 mL increments as it exited the columns. Each of these samples were analyzed for asphaltene content as described earlier. The results are plotted in FIG. 1.

Test #1

Test #1 incorporated a pre-saturation fluid of xylene to stimulate a hydrocarbon saturated matrix. Xylene was selected due to its ability to prevent precipitation or flocculation of bulk asphaltenes out of the crude oil. Aliphatic hydrocarbons promote the precipitation or flocculation of asphaltenes out of solution. This assured that loss of asphaltenes, from the effluent samples, was not due to precipitation out of solution.

The first 5 mLs of effluent contained less than 6% asphaltenes, indicating severe adsorption. The third effluent sample showed no reduction in asphaltene content indicating all surfaces were saturated with adsorbed asphaltenes and could not adsorb any more.

Test #2

The pre-flow saturation fluid in Test #2 was sodium lignosulfonate. The first effluent sample showed no loss of asphaltenes demonstrating that asphaltene adsorption could be prevented.

Test #3

Crude oil was flowed after saturation with "ENVIROSOL-XS" to demonstrate the compatibility between it and the crude oil. Adsorption of asphaltenes was reduced but not eliminated as it was with the sodium lignosulfonate.

Example 3

Visual Observations of Silica-gel/alumina Samples Exposed to Crude Oil and Treatment Fluids Step 1. Prior to exposure to crude oil or chemicals, silica gel and alumina were observed to consist of material grains having a uniform white color.

Step 2. Silica gel and alumina were contacted with crude oil. The material was washed with dichloromethane and dried. The grains were observed to have a variety of colors, from light brown to black. Observed differences in coloration were believed to be caused by different polar materials in the crude, with lighter colors being polar aromatics, and dark colors being resins and asphaltenes.

Step 3. Silica gel and alumina were saturated with xylene before being contacted with crude oil. After contact with crude oil, the sample was washed with dichloromethane to remove soluble oil components and dried. Grains were observed to be black due to adsorbed polar compounds from the oil. Xylene did not prevent adsorption of asphaltenes and made it more difficult to remove them.

Step 4. Silica gel and alumina saturated with a solution of "R-21 L" before being contacted with crude oil. After contact with crude oil, the sample was washed with dichloromethane to remove soluble crude oil components and dried. Grains were observed to be very brown, the color of the "R-21L", and were not black, indicating that asphaltenes did not adsorb.

Step 5. The same sample from Step 4 was washed with water. After washing, the sample was observed to have a uniform light brown color, very different than the samples of Steps 2 or 3. This observation clearly demonstrated that polar components in the crude oil did not adsorb onto the silica gel or alumina.

Step 6. Silica gel and alumina were saturated with a solution of "BIOACT" before being contacted with crude oil. After contact with crude oil, the sample was washed with dichloromethane to remove soluble crude oil components and dried. After washing, the sample exhibited a brownish-gray color, indicating absence of asphaltene adsorption from the crude oil.

Step 7. Silica gel and alumina were saturated with a solution of "BIOACT", followed by a solution of "R-21L", followed by crude oil. The sample was washed with dichloromethane to remove soluble crude oil components and dried. After washing, the sample exhibited a uniform light brown color very similar to the grains in Step 4, indicating that "BIOACT" did not interfere with the adsorption of "R-21L" to grain surfaces.

Step 8. Silica gel and alumina were saturated with crude oil, followed by "BIOACT", followed by "R-21L". The removed oil, "BIOACT", and "R-21L" were collected in the same container and put back through the column of silica gel and alumina to test the ability of "R-21L" to stay adsorbed to the grains and prevent asphaltene adsorption. A fresh sample of crude oil was put back through the column. The silica gel and alumina was cleaned with dichloromethane and dried. After washing, the silica gel sample exhibited a medium brown coloration with no black grains present, indicating that the combination of "BIOACT" and "R-21 L" remove and prevent the adsorption of resins and asphaltenes.

Example 4

Adsorption Capacity of Lignosulfonate Treatment Fluids

The adsorption capacity of a variety of lignosulfonate products onto polar materials was measured. A column of silica gel/alumina was hydrated with deionized water before a lignosulfonate product was added. Subsequent to lignosulfonate addition, the column was washed with 2% KCl until the effluent was clear. Effluent samples were analyzed using UV-VIS spectroscopy. Results are tabulated in Table 10.

TABLE 10

Adsorption Capacity Of Lignosulfonate Treatment Fluids

| LIGNOSULFONATE TREATMENT FLUID (PREPARED IN BRINE) | pH | ADSORPTION CAPACITY % PRODUCT RETAINED | mg PRODUCT RETAINED/gram OF ADSORBENT |
| --- | --- | --- | --- |
| "R-1" (3% by weight) | 8.86 | 69.6 | 7.50 |
| "R-3" (3% by weight) | 9.23 | 57.0 | 6.10 |
| "R-8" (3% by weight) | 6.96 | 53.8 | 5.79 |
| "R-21L" (3% by weight) | 9.90 | 43.7 | 3.84 |

Examples 5–7

Core Flow Testing

Core flow testing was conducted on one inch diameter plugs from a sandstone formation. The objective of these tests was to investigate effects on permeability by well stimulation treatments, including an "ENVIROSOL-XS" and sodium lignosulfonate treatment.

Three formation plugs were tested (#1, #2, & #3) in this study. These plugs were obtained in an unknown liquid saturation state. All samples contained significant quantities of formation crude oil. Benchtop tests on plug endtrims indicated that the reservoir from which the plugs were taken was an oil-wet sandstone.

Figure 2:
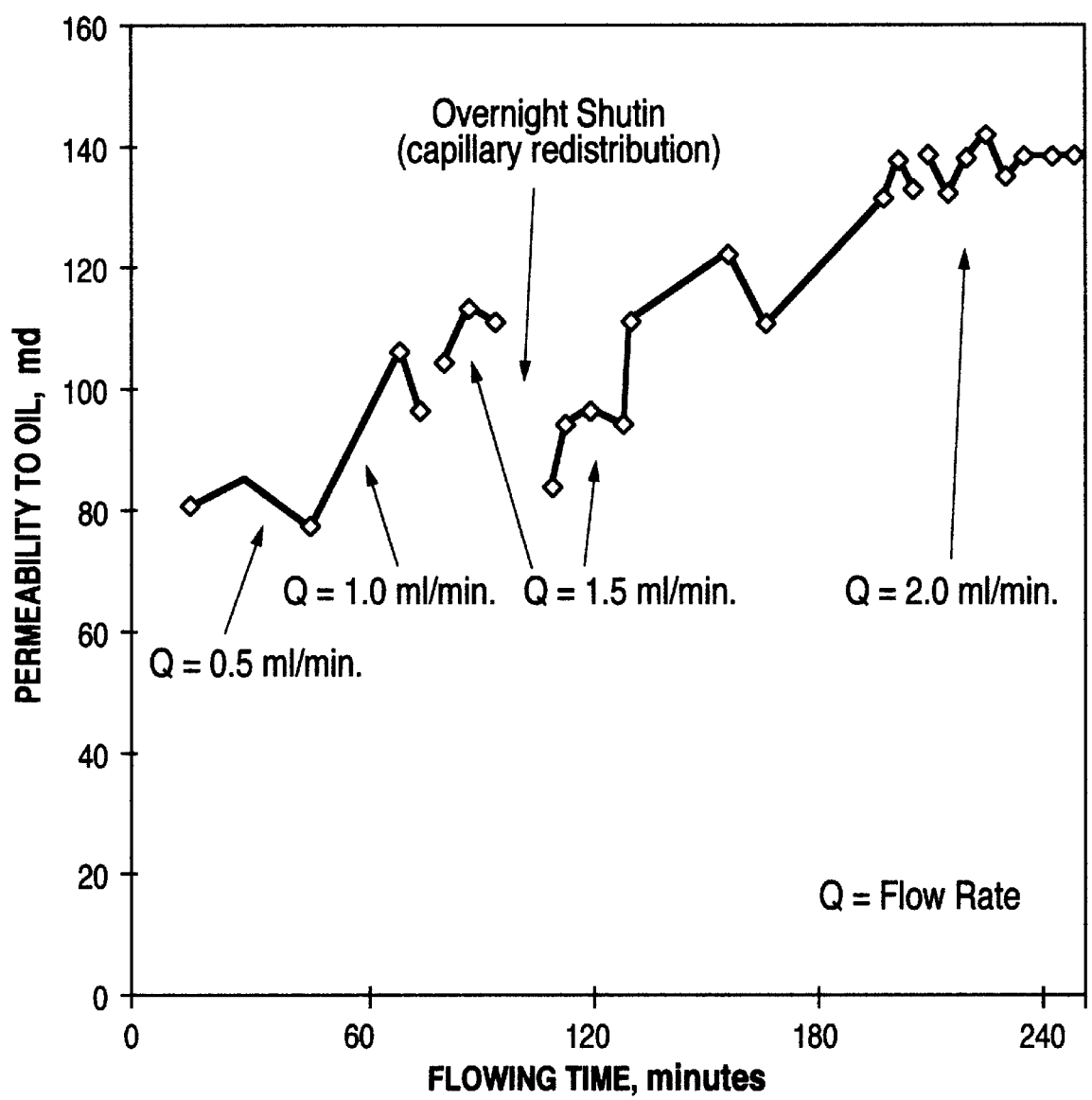
FIG. 2 shows regained permeability to oil as a function of time in a formation core following treatment according to one embodiment of the disclosed method.

The three core plugs were placed in a hydrostatic core-holder at approximately 200° F. An Isco constant-rate syringe pump was used to drive the fluids, and flow rates were held to low levels to prevent fines migration problems. Migratable fines problems were prevented by maintaining flow rates below critical velocity levels and by maintaining pH levels of less than 9.2. Permeability decreases caused by fines plugging were not observed in these tests. Selected fluids were pumped through the core at about 450 psig backpressure, while differential pressure was monitored to allow calculation of liquid permeability. Effluents were collected to assist in interpretation of the results. Formation crude oil was used in the oil permeability testing, and a synthetic formation brine ("SIMFORM" comprised of an 8:1:1 ratio of NaCl, KCl, and $CaCl_2$ mixed in de-ionized water, i.e., 875 grams de-ionized water, 100 grams NaCl, 12.5 grams KCl, and 12.5 grams $CaCl_2$) was utilized for the brine permeability measurements. Treatment fluids included "ENVIROSOL-XS" and a lignosulfonate (3% by weight) in "SIMFORM" brine. FIG. 2 presents the regained oil permeability data generated on Plug #3, which tracks permeability-cleanup following treatment.

Example 5: An "as-is" plug, containing unknown liquid saturations, was used in this test. Brine permeability of 313 millidarcies (md) was established at a flow rate of 1 milliliter per minute (mL/min), yielding a differential pressure of 0.6 psig. Approximately 180 mL (16 pore volumes) of "ENVIROSOL-XS" was pumped through the core, followed by 140 mLs. (12 pore volumes) of 3% by weight Lignosulfonate in "SIMFORM". Flow rate for these treatments were 2 mL/min, yielding differential pressures of approximately 10 psig ("ENVIROSOL-XS") and approximately 8 psig (sodium lignosulfonate). "SIMFORM" brine was subsequently pumped through the core at 2 mL/min, to evaluate post-treatment brine permeability. Differential pressure decreased during cleanup from approximately 4.3 psig to approximately 2.6 psig. Reduction of the flow rate to 1 mL/min halved the differential pressure to 1.2 psig, with a calculated brine perm of 147 md.

The Isco pumps used for fluid transfer had finite volumes and periodically had to be refilled. While the pump was filling, the core flow was temporarily shut-in for approximately 5 minutes. During the post-treatment brine permeability measurements, it was noted that the effluent contained higher amounts of lignosulfonate immediately after these shut-ins. It is believed that during this short shut-in, portions of the lignosulfonate entrained in the core's residual water saturation moved by diffusion into the "SIMFORM" brine, resulting in lignosulfonate cleanup during subsequent water production.

Core flow testing of Plug #1 was carried out to evaluate the effect on brine permeability of an "ENVIROSOL-XS" and sodium lignosulfonate treatment on a core that had not undergone solvent extraction and drying. Brine permeability on this sample decreased from 313 md to 147 md, although testing on Plug #2 indicates that the lignosulfonate treatment does not reduce brine permeability. The fluids in Plug #1 were all water-based materials, except the ENVIROSOL-XS, which has a hydrocarbon solvent dispersed in the water-based formulation. The hydrocarbon solvent may have acted as a third liquid phase, reducing the relative permeability to water. Also, changing oil wet surfaces to a water wet condition may decrease permeability to brine.

Example 6: Plug #2 was pre-cleaned by solvent reflux with dichloromethane for several days prior to core flow testing, but subsequent testing indicated that oil was still present in the core. "SIMFORM" brine was pumped through the core at low flow rate (1 mL/min) to determine brine permeability at residual oil saturation ($K_{w@Sor}$). Differential pressure was approximately 0.6 psig, yielding a permeability of 240 md. The 3% by weight lignosulfonate solution was pumped through the core at 1 mL/min for 150 milliliters. Differential pressure, and therefore permeability, rapidly returned to the original level (0.6 psig & 240 md). This example shows that treatment of a partially-cleaned core (Plug #2) with a 3% by weight lignosulfonate solution resulted in no alteration of the brine permeability.

Example 7: An "as-is" plug was used in this test, where $K_O$ was determined prior to treatment with crude oil. An oil viscosity of 10 centipoise was utilized in $K_O$ calculations.

Differential pressure during the initial oil permeability measurement was 8.2 psig at a flow rate of 0.5 mL/min., yielding a permeability of 142 md. Approximately 150 milliliters of "ENVIROSOL-XS" was pumped through the core while the flow rate was stair-stepped up to 2 mL/min. The "ENVIROSOL-XS" flow was stopped for 1 hour, then treatment resumed. The sodium lignosulfonate solution (120 mL) was then pumped through the core to complete the treatment stages. Crude oil was flushed through the core at flow rates increasing from 0.5 mL/min. up to 2.0 mL/min. The resultant differential pressures increased as a function of the flow rate increases, but the calculated oil permeabilities ($K_{O@Swr}$) increased also, indicating expulsion/cleanup of the water-based treatment fluids. Frequent variations in differential pressure were noted during the crude oil flow, indicative of temporary fluid blockages at pore-throats during cleanup. Retained effluent oil samples taken at regular intervals contained a scattering of water droplets, confirming water expulsion. It appears that the oil permeability returned to the same approximate level (140 vs 142 md) due to expulsion of water. Water expulsion is a function of increased differential pressures, which in this test was the result of increasing flow rate.

FIG. 2 presents the data generated during the regained oil permeability phase of testing following treatment with the "ENVIROSOL-XS" and lignosulfonate solution. Oil permeability (in millidarcies) is plotted versus Flowing Time (in minutes). As noted above, the flow rate (Q) was stair-stepped from 0.5 mL/min up to 2.0 mL/min. and oil permeability plateaued at the same approximate level (140 md) as original oil permeability (142 md). This data shows that oil permeability ($K_O$) was not adversely affected by treatment with "ENVIROSOL-XS" and sodium lignosulfonate. The oil permeability of Plug #3 returned to the original level after treatment with the "ENVIROSOL-XS" and sodium lignosulfonate solutions. Cleanup ($K_O$ increase) after treatment was interpreted to be a function of water expulsion caused by increased pressure drops, as a function of increased flow rates.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of treating a subterranean formation penetrated by a production wellbore to inhibit adsorption of asphaltenes, comprising:

pumping a treatment fluid through said production wellbore, wherein said treatment fluid consists essentially of lignosulfonate; and contacting said subterranean formation with said treatment fluid, wherein adsorption of asphaltenes onto said subterranean formation is inhibited due to contact of said treatment fluid with said formation.

2. The method of claim 1, further comprising:

determining a treatment volume greater than or equal to the volume required to treat said subterranean formation out to a radius around said wellbore where asphaltene precipitation has or is expected to occur; and pumping a volume of treatment fluid through said production wellbore;

wherein said volume of treatment fluid is greater than or equal to said determined volume required to treat said subterranean formation out to a radius where asphaltene precipitation has occurred or is expected to occur.

3. The method of claim 1, wherein said treatment fluid consists essentially of at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof.

4. The method of claim 1, wherein said treatment fluid consists essentially of sodium lignosulfonate.

5. The method of claim 1, wherein said treatment fluid consists essentially of from about 1% to about 5% by weight of a lignosulfonate.

6. A method of treating a subterranean formation penetrated by a production wellbore to inhibit adsorption of asphaltenes, comprising:

pumping a treatment fluid through said production wellbore, wherein said treatment fluid comprises a sacrificial compound;

contacting said subterranean formation with said treatment fluid, wherein adsorption of asphaltenes onto said subterranean formation is inhibited due to contact of said treatment fluid with said formation; and pumping a pretreatment fluid into said production wellbore prior to pumping said treatment fluid into said production wellbore, wherein said pretreatment fluid comprises terpene.

7. A method of treating a subterranean formation penetrated by a production wellbore to inhibit adsorption of asphaltenes, comprising:

pumping a treatment fluid through said production wellbore, wherein said treatment fluid consists essentially of an aqueous solution comprising between about 0.1% and about 50% by weight of at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof; and injecting said treatment fluid into said subterranean formation.

8. The method of claim 7, wherein said treatment fluid consists essentially of sodium lignosulfonate.

9. A method of treating a subterranean formation penetrated by a production wellbore to inhibit adsorption of asphaltenes, comprising:

pumping a treatment fluid through said production wellbore, wherein said treatment fluid comprises an aqueous solution comprising between about 0.1% and about 50% by weight of at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof; and injecting said treatment fluid into said subterranean formation;

pumping a pretreatment fluid into said production wellbore prior to pumping said treatment fluid into said production wellbore, wherein said pretreatment fluid comprises at least one of an organic solvent, an acid, a hydrocarbon fluid, a brine, or a mixture thereof; and injecting said pretreatment fluid into said subterranean formation prior to injecting said treatment fluid into said subterranean formation.

10. A method of removing and inhibiting adsorption of asphaltenes in a subterranean formation penetrated by a production wellbore, comprising the steps of:

pumping a pretreatment fluid through said production wellbore, wherein said pretreatment fluid is effective to remove asphaltenes present on surfaces of said subterranean formation, and wherein said pretreatment fluid is injected into said subterranean formation; and pumping a treatment fluid through said production wellbore, wherein said treatment fluid comprises a lignosulfonate, and wherein said treatment fluid is injected into said subterranean formation.

11. The method of claim 10, wherein said pretreatment fluid comprises at least one of an organic solvent, an acid, a hydrocarbon, a brine, or a mixture thereof.

12. The method of claim 11, wherein the organic solvent comprises at least one of xylene, toluene, terpene, or a mixture thereof.

13. The method of claim 10, wherein said treatment fluid comprises at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof.

14. The method of claim 10, wherein the treatment fluid comprises an aqueous solution comprising between about 1% and about 5% by weight of at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof.

15. The method of claim 10, wherein the treatment fluid comprises an aqueous solution comprising between about 1% and about 5% by weight of sodium lignosulfonate.

16. A method of treating a subterranean formation penetrated by a production wellbore to inhibit adsorption of asphaltenes, comprising the steps of:

pumping a treatment fluid through said production wellbore, wherein said treatment fluid comprises a solution comprising a lignosulfonate compound mixed with water, an organic solvent, a salt, and a surfactant; and contacting said subterranean formation with said treatment fluid, wherein adsorption of asphaltenes onto said subterranean formation is inhibited due to contact of said treatment fluid with said formation.

17. A method of treating a subterranean formation penetrated by a production wellbore to inhibit adsorption of asphaltenes, comprising:

pumping a treatment fluid through said production wellbore, said treatment fluid comprising an aqueous solution comprising between about 0.1% and about 50% by weight of at least one of an oxidized lignosulfonate, a chrome lignosulfonate, a lignosulfonate carboxylated with chloracetic acid, a sulfomethylated lignosulfonate, a lignosulfonate carboxylated with carbon dioxide and halocarboxylic acid, a sodium, calcium, magnesium or ammonium salt of a lignosulfonate, or a mixture thereof;

injecting said treatment fluid into said subterranean formation;

pumping a pretreatment fluid into said production wellbore prior to pumping said treatment fluid into said production wellbore, said pretreatment fluid comprising an aqueous solution comprising from about 0.1% to about 10% by volume surfactant, from about 1% to about 50% by volume of an organic solvent, and from about 0.5% to about 10% by weight of a salt, and wherein said salt comprises at least one of potassium chloride, sodium chloride, calcium chloride, magnesium chloride, or a mixture thereof; and injecting said pretreatment fluid into said subterranean formation prior to injecting said treatment fluid into said subterranean formation.

18. A method of removing and inhibiting adsorption of asphaltenes in a subterranean formation penetrated by a production wellbore, comprising the steps of:

pumping a pretreatment fluid through said production wellbore, said pretreatment fluid comprising an aqueous solution comprising between about 5% and about 20% terpene, and wherein said pretreatment fluid is effective to remove asphaltenes present on surfaces of said subterranean formation, and wherein said pretreatment fluid is injected into said subterranean formation; and pumping a treatment fluid through said production wellbore, said treatment fluid comprising a lignosulfonate, and wherein said treatment fluid is injected into said subterranean formation.

19. The method of claim 18 wherein the treatment fluid comprises an aqueous solution comprising between about 1% and about 5% by weight of sodium lignosulfonate.

20. A method of treating a subterranean formation penetrated by a production wellbore to inhibit adsorption of asphaltenes, comprising:

determining a treatment volume greater than or equal to the volume required to treat said subterranean formation out to a radius around said wellbore where asphaltene precipitation has or is expected to occur; and pumping a volume of treatment fluid through said production wellbore, said treatment fluid comprising a sacrificial compound; and wherein said volume of treatment fluid is greater than or equal to said determined volume required to treat said subterranean formation out to a radius where asphaltene precipitation has occurred or is expected to occur.

21. The method of claim 20 wherein said sacrificial compound comprises a lignosulfonate-based compound.

22. The method of claim 20 wherein said sacrificial compound comprises at least one of an alkaline inorganic salt, a water-soluble polymeric viscosifier, petroleum sulfonate, a polybasic carboxylic acid, or a combination thereof.

23. The method of claim 20 wherein the subterranean formation comprises a formation matrix having a surface, and wherein the sacrificial compound inhibits the asphaltenes from adsorbing onto the formation matrix immediately surrounding the wellbore.

24. The method of claim 20, further comprising pumping a pretreatment fluid into the wellbore prior to pumping the treatment fluid into the wellbore, the pretreatment fluid being capable of removing asphaltenes from the surface of the subterranean formation.

25. The method of claim 20 wherein the sacrificial compound comprises at least one of sodium naphthalenesulfonate-formaldehyde, sodium lignosulfonate, alkylated naphthalene sulfonic acid in aromatic solvent, isopropylamine dodecylbenzene sulfonate, ammonium salt of petroleum naphthalene sulfonate, calcium salt of petroleum naphthalene sulfonate, potassium salt of petroleum naphthalene sulfonate, naphthalene sulfonate, alkylamine alkylaryl sulfonate, sodium alkylnaphthalene sulfonate, or a combination thereof.

26. The method of claim 20 wherein the sacrificial compound comprises at least one of a lignosulfonate salt modified by alkoxylation, a lignosulfonate that has been at least partially reacted with carbon dioxide, a lignosulfonate that has been at least partially reacted with chloroacetic acid, a lignosulfonate that has been at least partially modified by oxidation, or a combination thereof.

27. The method of claim 1 wherein said lignosulfonate consists esentially of at least one of a straight chain sodium lignosulfonate, a modified calcium lignosulfonate, a modified sodium lignosulfonate, or a mixture thereof.

28. A method of treating a subterranean formation penetrated by a production wellbore to inhibit adsorption of asphaltenes, comprising:

pumping a treatment fluid through said production wellbore, wherein said treatment fluid comprises a sacrificial compound;

contacting said subterranean formation with said treatment fluid, wherein adsorption of asphaltenes onto said subterranean formation is inhibited due to contact of said treatment fluid with said formation; and pumping a pretreatment fluid into said production wellbore prior to pumping said treatment fluid into said production wellbore, wherein said pretreatment fluid comprises at least one of an organic solvent, an acid, a hydrocarbon, a brine solution, a gas, or a mixture thereof;

wherein said sacrificial compound comprises at least one of sodium naphthalenesulfonate-formaldehyde, sodium lignosulfonate, alkylated naphthalene sulfonic acid in aromatic solvent, isopropylamine dodecylbenzene sulfonate, ammonium salt of petroleum naphthalene sulfonate, calcium salt of petroleum naphthalene sulfonate, potassium salt of petroleum naphthalene sulfonate, alkylamine alkylaryl sulfonate, sodium alkylnaphthalene sulfonate, or a combination thereof.

29. The method of claim 1 wherein said lignosulfonate consists essentially of at least one of a lignosulfonate salt modified by alkoxylation, a lignosulfonate that has been at least partially reacted with carbon dioxide, a lignosulfonate that has been at least partially reacted with chloroacetic acid, a lignosulfonate that has been at least partially modified by oxidation, or a combination thereof.

30. The method of claim 7 wherein said lignosulfonate consists essentially of at least one of a straight chain sodium lignosulfonate, a modified calcium lignosulfonate, a modified sodium lignosulfonate, or a mixture thereof.

\* \* \* \* \*